United States Patent Office 3,451,755
Patented June 24, 1969

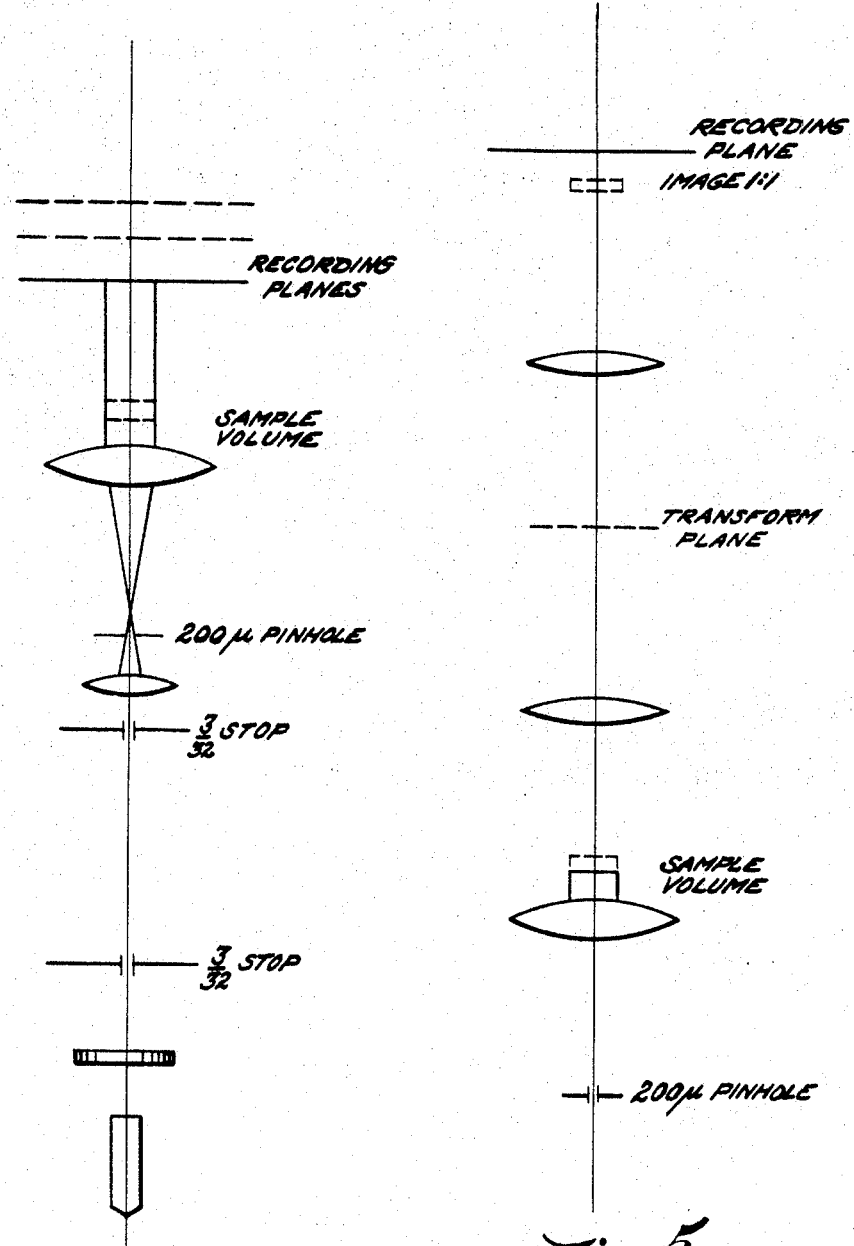

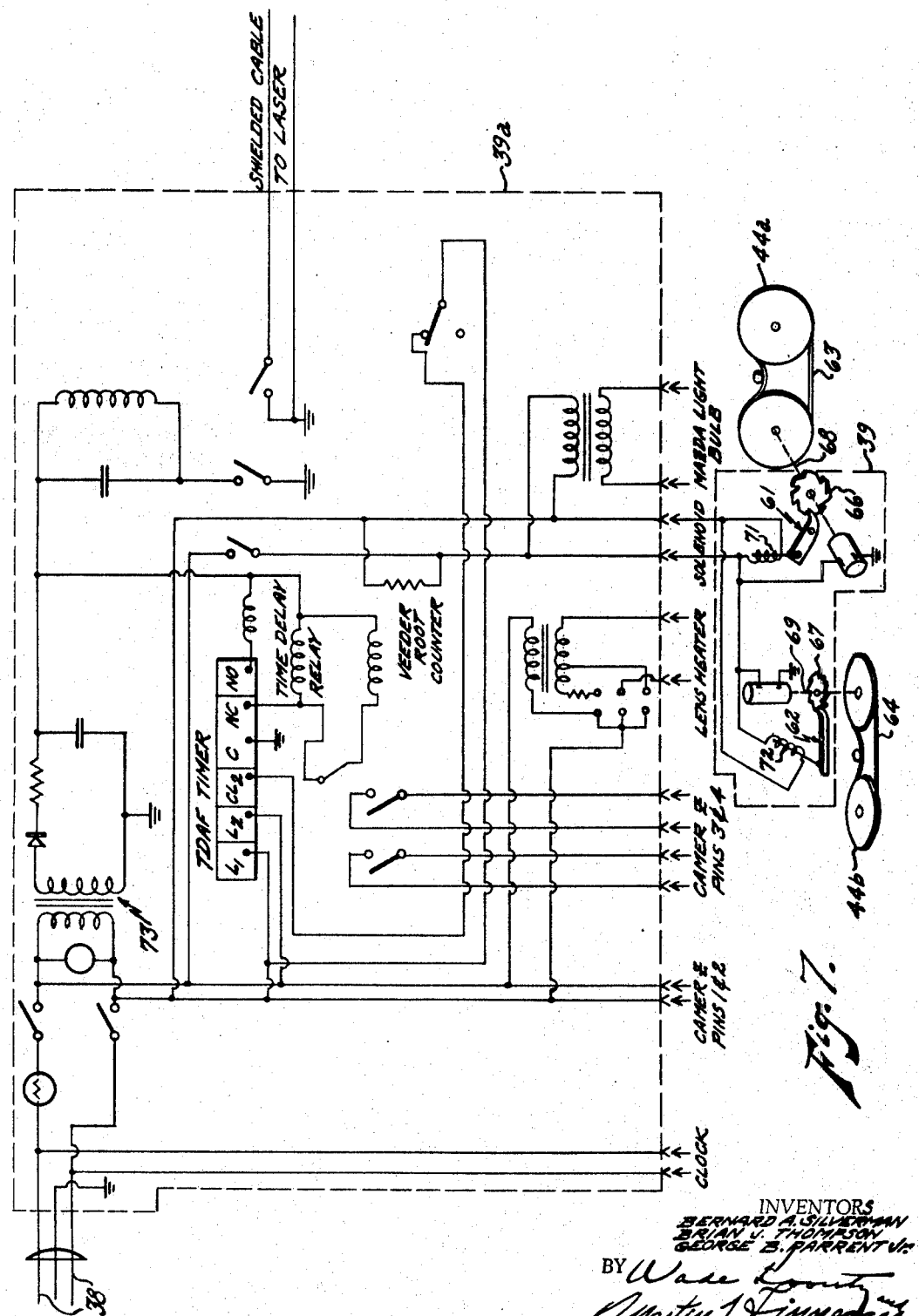

3,451,755
PARTICLE SIZE AND DISTRIBUTION ANALYSIS USING SPATIAL FILTERING TECHNIQUES
Bernard A. Silverman, Natick, Brian J. Thompson, Chelmsford, and George B. Parrent, Jr., Carlisle, Mass., assignors to the United States of America as represented by the Secretary of the Air Force
Filed Aug. 5, 1964, Ser. No. 387,816
Int. Cl. G01n 15/02; G02b 5/18; G06k 9/08
U.S. Cl. 356—102       2 Claims

ABSTRACT OF THE DISCLOSURE

A system for measuring the size and distribution of atmospheric particles without disturbing the particles in which a pulsed ruby laser is focused on a pinhole, recollimated, and directed through the sample. Spatial filtering to remove the background is performed by an inclined mirror having a small opening, and the results are photographed in synchronization with the pulsed laser.

---

The invention described herein may be manufactured and used by or for the United States Government for governmental purposes without payment to us of any royalty thereon.

This invention relates to laser systems, and more particularly to the use of a laser beam to control the recording of aerosological phenomena on reeled film.

The invention provides a method of measuring the size and distribution of fog droplets or other atmospheric particles, the method being characterized by utilization of the principle that a collimated quasi-monochromatic beam of light will establish a diffraction pattern when intercepted by a particle-laden spray or jet in the form of a sample volume of the atmosphere or fluid mass to be analyzed.

The method to be described uses the diffraction patterns formed by opaque and transparent particles when illuminated by a collimated quasi-monochromatic beam of light. The plane in which the diffraction patterns are recorded is at a sufficient distance from the sample volume for far field approximations to Fraunhofer diffraction. While spherical particles or particles which present a circular cross-section to the beam are more easily handled other geometries may be considered.

This type of measuring device can be used for stationary samples using conventional optics for producing collimated quasi-monochromatic illumination. However, its main advantage is that it can be used for measuring particle sizes when the sample is in motion by using a pulsed laser as a source of illumination. Furthermore, since no collecting methods or sample dilution is involved the sample distribution is not affected by the measuring technique. High repetition rate pulsed lasers allow for rapid data collection and meaningful sampling.

The advantage of looking at diffraction patterns instead of images is immediately seen once it is realized that the smaller the object the greater the diffraction effect. In particular it is the Fraunhofer diffraction patterns that are used. Fraunhofer diffraction patterns are strictly formed when the point of observation is infinitely distant from a coherently illuminated object. Approximations to this situation are established in the literature. The condition to be used here is the so-called far field or far zone condition. The particles are illuminated by a collimated quasi-monochromatic beam and the distance $z$ from the diffraction objects to the recording plane is such that $$|z| \gg \frac{(\xi^2 + \eta^2)}{\lambda} \text{ max.} \quad (1)$$

where $\xi$ and $\eta$ are coordinates of a general point in the diffracting object and $\lambda$ is the wavelength of the incident plane wave. Consider that the droplets present a circular cross-section of diameter $2a$ to the beam of light then the approximation given by Equation 1 may be rewritten.

$$|z| \geq \frac{(2a)^2}{\lambda} \quad (2)$$

The particles are contained in a small sample volume and may be illuminated by a collimated beam of quasi-monochromatic light. The field seen by the light consists essentially of small diffracting dots on an otherwise transparent field. The recording plane is set up so that it is in the far field of the individual particles then in this plane diffraction patterns will be observed which are associated with, and at the location of, the individual particles. The recording plane is however still in the near field of the whole random array.

The diffraction patterns obtained under the conditions outlined above are only well-known if the objects are circular transparent apertures in a black screen. For the converse situation that is of interest here account must be taken of the coherent background. The types of pattern obtained under the above experimental conditions have been fully studied and examined both theoretically and experimentally.

Let $D(\xi)$ represent the geometry of an opaque two dimensional object which is placed in a coherent, collimated quasi-monochromatic beam. The diameter of the beam is much greater than the maximum dimension of the diffracting object. For circular symmetry $$D(\xi) = \begin{vmatrix} 1(\xi) < a \\ 0(\xi) > a \end{vmatrix} \quad (3)$$

and the intensity distribution across the diffraction pattern associated with each particle is $$I(\rho) = 1 - \frac{2ka^2}{z} \sin \frac{k\rho^2}{2z} \wedge 1\left(\frac{ka\rho}{z}\right) + \frac{k^2 a^4}{z^2} \left(\wedge 1\left(\frac{ka}{z}\right)\right)^2 \quad (4)$$

where $\rho$ is the magnitude of the position vector in the observation plane, $\wedge_1$ is the usual nomenclature for a Bessel function of the first kind divided by its argument and $k = 2\pi/\lambda$. Appropriate expressions may be written down for other geometries.

The resultant intensity distribution described by Equation 4 contains three terms; the first term is simply a constant and the final term will be recognized as the usual distribution associated with the Fraunhofer diffraction pattern of a circular aperture having the same dimensions as the particle (i.e., the well known Airy pattern). The middle term, however, involves the amplitude distribution associated with the Fraunhofer pattern of a circular aperture multiplied by a sine function, which is independent of the size of the particle. These terms really represent the interference between the diffraction pattern from the particle and the coherent background illumination.

In the drawings:

FIGS. 4 and 5 are schematic diagrams of alternate forms of apparatus for practice of the invention;

FIG. 7 shows additional circuitry.

To obtain the information required concerning the diameter of the particle there are two ways of proceeding. Firstly the background illumination may be removed by spatial filtering so that only the light diffracted by the particle is retained—Airy patterns are then formed. Secondly the patterns described by Equation 4 may be used directly.

Figure 3:
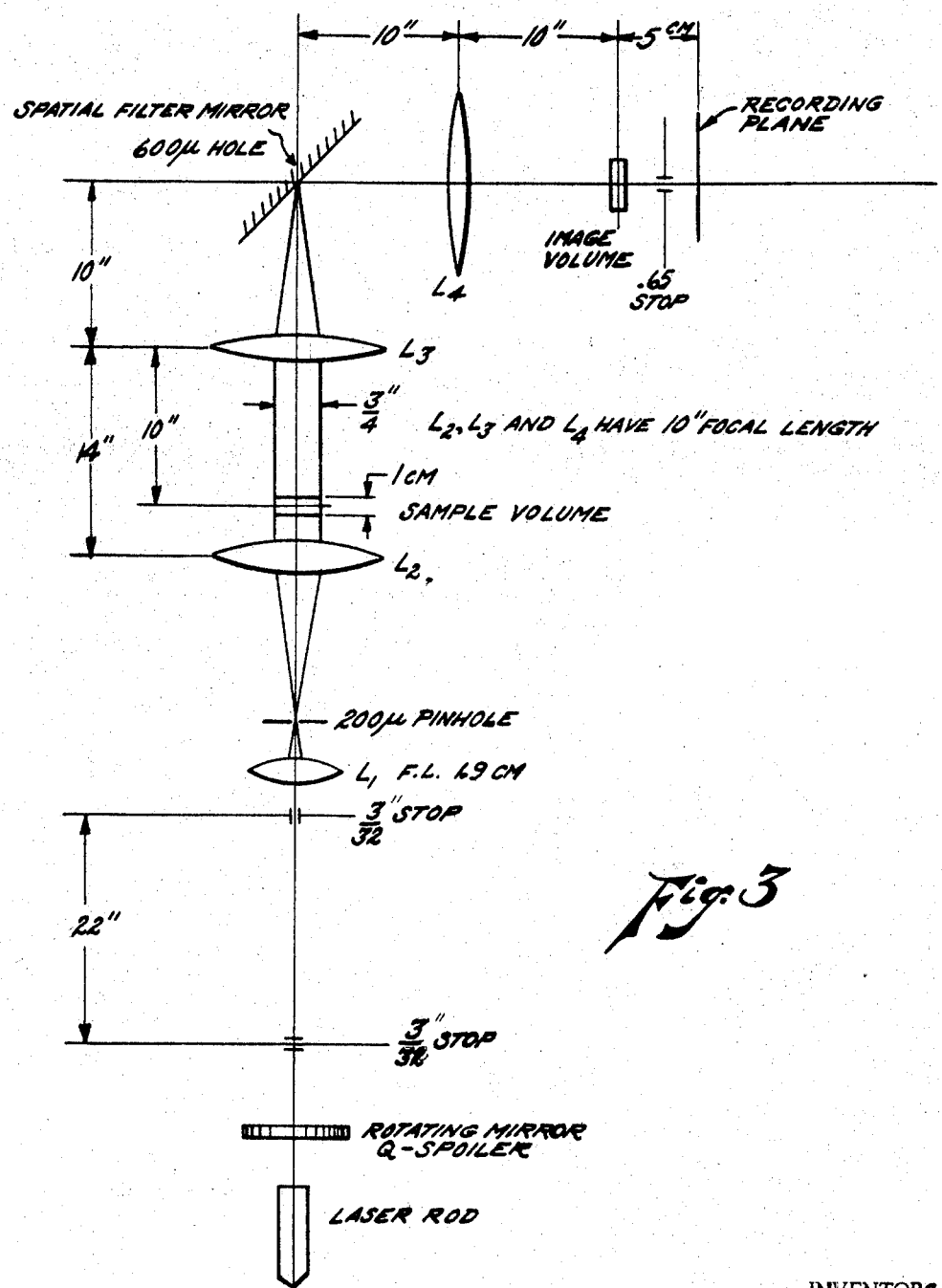
FIG. 3 is a schematic diagram of apparatus facilitating practice of the invention.

FIG. 3 (method A) shows a schematic of the spatial filter apparatus with all the essential parameters indicated. A Trion Q-switched ruby laser system was used as a light source. The system output was a 2 microsecond pulse at 6943 A. with energy ~0.5 joule and peak power of ~0.7 megawatt. Pulse rates of up to ten pulses a minute for extended periods of time were used. The output of the pulsed ruby laser is focused on a 200 micron pinhole by lens $L_1$ and recollimated by lens $L_2$. The collimated beam of coherent quasi-monochromatic light passes through the sample volume and lens $L_3$ forms the Fourier transform of the sample in the plane of the inclined mirror. The patterns formed by each droplet are centered on the optical axis and add in amplitude and phase together with the pattern from the aperture limiting the dimensions of the sample cross-sectional area. The patterns of the droplets are, however, very much larger than the pattern of the activating aperture due to the reciprocal nature of the relationship between object size and corresponding diffraction pattern. A small hole of approximately 600 microns in diameter in the mirror with an incline of 45 degrees to the axis allows the central part of the concentrically formed patterns to pass through while it reflects the remainder on to lens $L_4$. The size of the hole is such as to allow the zero order of the pattern produced by the limiting aperture to pass. The lens $L_4$, with a focal length equal to lens $L_3$, transforms the amplitude distribution at the mirror into an image of the object sample minus, of course, the DC background. While the object appears as a dark spot on a bright background, its image after spatial filtering appears as a bright spot on a dark background. The Fraunhofer diffraction patterns are recorded on film using 35 mm. camera located at various distances from the image plan large enough to render the approximations of Equation 2 valid. FIG. 10 shows a typical frame of the photographic record taken using water droplets from an aerosol spray. The diffraction pattern follows the $$\wedge_1 \left[ \left( \frac{ka\rho}{z} \right) \right]^2$$

form.

Figure 1:
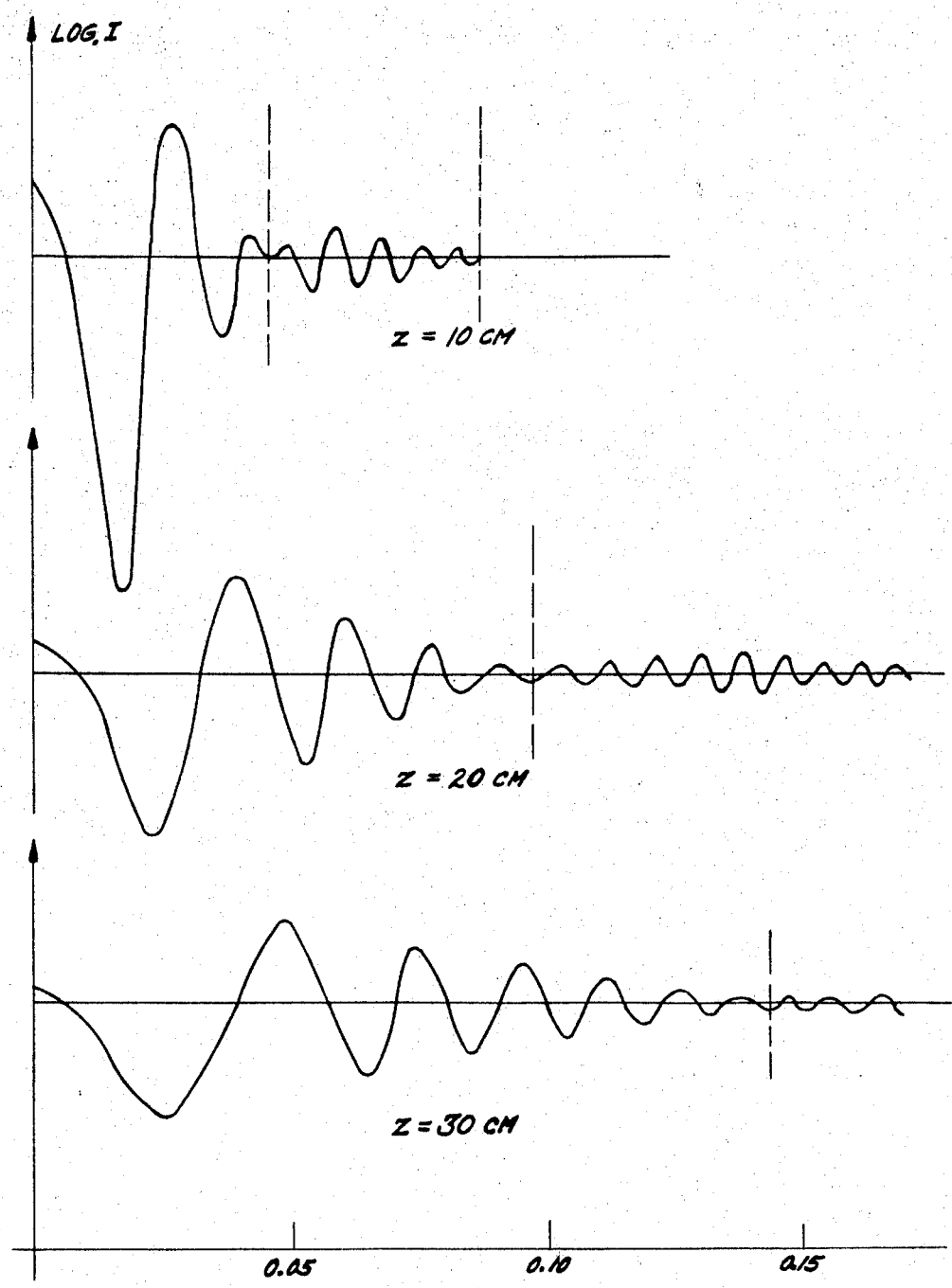
FIGS. 1 and 2 are sets of graphs showing variation of particle intensity distribution in a photographic recording of a beam diffraction pattern with variation in the distance between selected sample and recording plane (FIG. 1) and with variation in particle diameter (FIG. 2)
Figure 2:
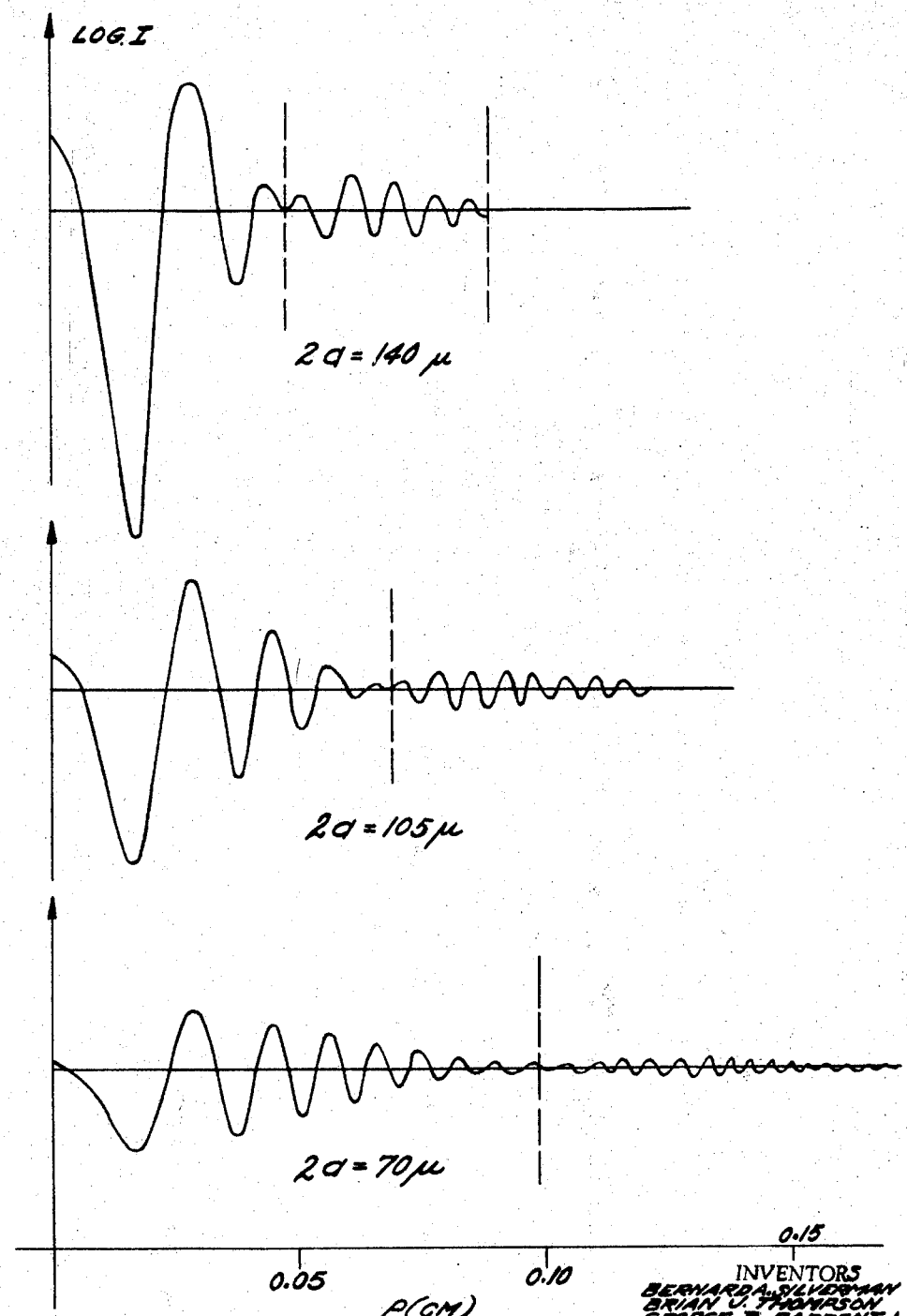

FIGS. 1 and 2 show that the position of the minima of the $$\wedge_1 \left( \frac{ka\rho}{z} \right)$$

term are recognizable and measureable. Furthermore, the positions of the other peaks in the distribution are dependent only on the value of $z$, hence $z$ can be determined from these peaks allowing accurate determination of the particle diameter to be made.

A schematic diagram of the coherent background method (method B) is given in FIG. 4 with an alternative version given in FIG. 5. The source and collimating arrangements are the same as discussed in FIGURE 3. The sample distribution is imaged by the optical system with a magnification of unity. This enables the recording plane to be set at any distance from the image plane that may be desirable and removes the bulky film transport device to a position where it cannot interfere with the sampling.

The diffraction patterns are recorded on the film using the same sample volume and 35 mm. camera back as before. The alternative version is necessary when small particles are involved since it is impossible to place the camera in close proximity to the sample. However, no such restriction is involved with the image plane of the sample.

Both methods are able to give satisfactory results. However, the accuracy of method A is limited since the exact location of the particular particle in the sample volume is not shown. About 10% accuracy can be obtained. However, method B allows for the determination of the parameter $z$. Method B also has the advantage that less energy is required in the illumination to produce the patterns. These facts together with the simpler design make method B more useful.

Figure 6:
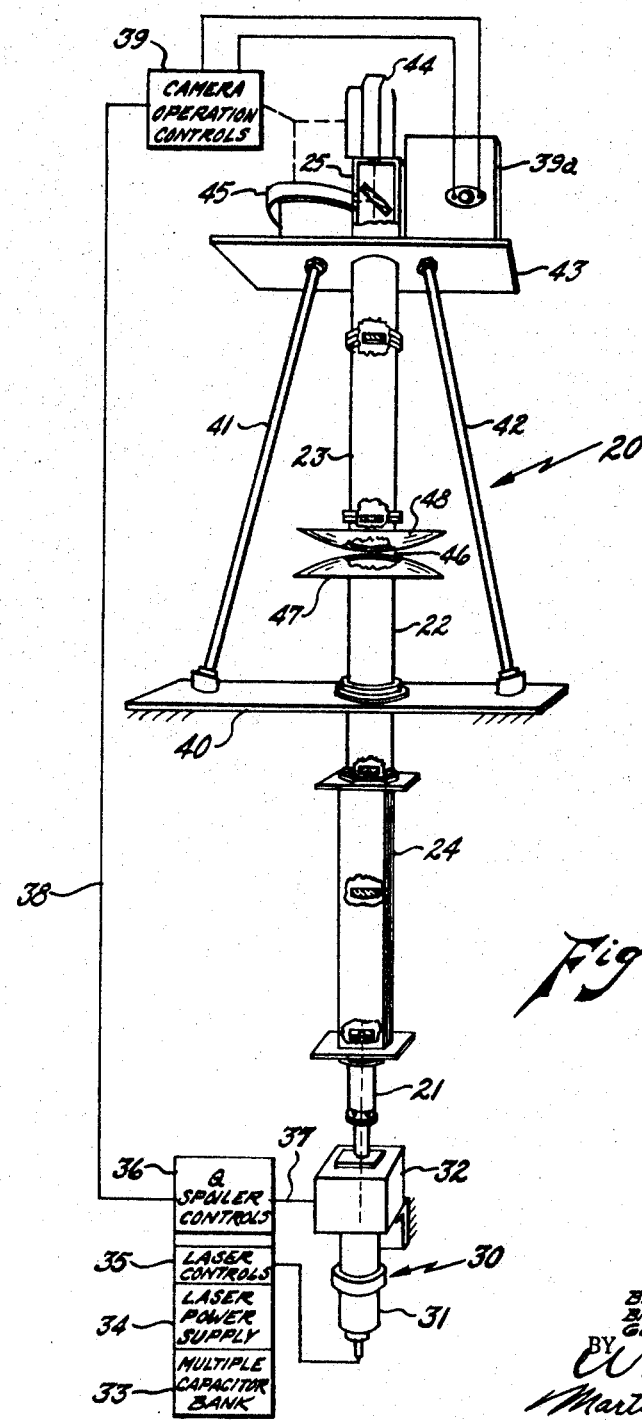
FIG. 6 is a vertical assembly view, including associated circuitry, of apparatus embodying the principles shown schematically in FIGS. 4 and 5.

The laser shadow-graph disdrometer herein described is an instrument for continuously recording the size distribution of atmospheric aerosols and hydrometeors greater than about one (1) micron in diameter. As shown in FIGURE 6 the apparatus includes a vertically aligned assembly 20 of three cylindrical tubes 21, 22, and 23, linking with two rectangular sections 24 and 25, to form an integrated housing to confine the mirror and lenses heretofore described, as well as the light beam emanating from a substantially conventional laser-beam generating unit 30 having as component parts a main light source 31 and a Q-spoil chamber 32, the former being electrically energized by capacitor bank 33 and power supply 34, by way of laser controls 35, while the Q-spoil chamber has an electrical power take-off conductor 37 feeding control circuitry 36 and conductor 38 leading to camera operating circuitry 39 and 39a shown in greater detail in FIGURE 9.

As also indicated in FIGURE 6 the assembly includes a cross-plate 40 adapted to rest upon any suitable base, not shown, such as the upper structure or roof of a vehicle or mobile unit for transporting the assembly to successive points of investigation. Extending upwardly from cross-plate 40 are two struts 41, 42 supporting a second cross-plate 43 carrying two camera assemblies 44, 45, housing a pair of film transport reels 44a and 44b (FIG. 7). The struts 41, 42 serve as adjustable means for regulating the free air space 46 between the two flared disks 47, 48 at the abutting terminals of the aligned tubes 22, 23. Through this free space 46 passes the particle-laden fluid to be analysed.

Referring to FIGURE 7, the operating circuitry 39 and 39a includes a pair of solenoid controlled actuators 61, 62 for advancing the film 63, or 64 as the case may be, step by step, by action of the actuators 61, 62 upon notched disks 66, 67 mounted on reel shafts 68, 69, respectively. These advancing impulses are derived from the successive electrical impulses to the windings of solenoids 71, 72, which windings receive current from the control unit 36 (FIG. 6) by way of conductors 38, transformer 73 and the several control units interposed between transformer 73 and the said solenoids 71, 72. As shown in FIGURE 7 these interposed control units also control operation of all electrical components of the camera assembly, and related power supply leads.

What we claim is:

1. A Fraunhofer diffraction system for measuring the size and distribution of atmospheric particles without disturbing the particles comprising:
   (a) a pulsed ruby laser;
   (b) a first lens for focusing the beam from the ruby laser;
   (c) a second lens in alignment with the first lens for recollimating the laser beam, and having a pinhole interposed between the first and second lenses;
   (d) a sample source of atmospheric particles in alignment with the second lens;
   (e) a third lens in alignment with sample source;
   (f) an inclined mirror having a hole in the order of 600 microns, the third lens forming a Fourier transform on the plane of the inclined mirror;
(g) a fourth lens in alignment to receive reflections from the inclined mirror, the second, third, and, fourth lens having the same focal length;
(h) and means for photographing the images of the object sample, the photographing means being in alignment with the fourth lens.

2. A Fraunhofer diffraction system according to claim 1 which further comprises means for synchronizing the photographing means with the pulsed ruby laser.

References Cited

UNITED STATES PATENTS 3,305,834   2/1967   Cooper et al.

OTHER REFERENCES

Vander Lugt: Signal Detection By Complex Spatial Filtering, IEE Trans. on Information Theory, vol. It–10, pp. 139–145, Apr. 1964.

RONALD L. WIBERT, *Primary Examiner.*

WARREN A. SKLAR, *Assistant Examiner.*

U.S. Cl. X.R.

350—162; 356—71, 103, 106